United States Patent [19]

König et al.

[11] Patent Number: 4,808,691

[45] Date of Patent: Feb. 28, 1989

[54] POLYETHER-POLYCARBONATE DIOLS AND PROCESSES FOR THEIR PRODUCTION AND USE

[75] Inventors: Klaus König, Odenthal; James M. Barnes, Wermelskirchen, both of Fed. Rep. of Germany

[73] Assignee: Bayer Aktiengesellschaft, Leverkusen Bayerwerk, Fed. Rep. of Germany

[21] Appl. No.: 193,303

[22] Filed: May 11, 1988

[30] Foreign Application Priority Data

May 21, 1987 [DE] Fed. Rep. of Germany ....... 3717060

[51] Int. Cl.[4] .............................................. C08G 18/32
[52] U.S. Cl. ...................................... 528/76; 528/367; 528/370; 528/372; 558/266
[58] Field of Search ................ 528/76, 367, 370, 372; 558/266

[56] References Cited

U.S. PATENT DOCUMENTS

| 2,492,955 | 1/1950 | Ballard et al. | 260/615 |
|---|---|---|---|
| 3,640,967 | 2/1972 | Konig et al. | 260/77.5 |
| 3,758,443 | 9/1973 | Konig et al. | 260/75 |
| 3,867,350 | 2/1975 | Pedain et al. | 260/77.5 |
| 4,105,641 | 8/1978 | Buysch et al. | 526/712 |
| 4,463,191 | 7/1984 | D'Sidocky et al. | 564/398 |
| 4,476,293 | 10/1984 | Robinson | 528/76 |

FOREIGN PATENT DOCUMENTS

| 857948 | 12/1952 | Fed. Rep. of Germany . |
|---|---|---|
| 1570540 | 3/1970 | Fed. Rep. of Germany . |
| 928277 | 6/1963 | United Kingdom . |
| 1263225 | 2/1972 | United Kingdom . |
| 1476268 | 6/1974 | United Kingdom . |

OTHER PUBLICATIONS

P. Ball, H. Fiullmann & W. Heitz, Angew. Chem. Int. Ed., 92, 1980, No. 9, pp. 742–743.

*Primary Examiner*—Maurice J. Welsh
*Attorney, Agent, or Firm*—Gene Harsh; Joseph C. Gil; Lyndanne M. Whalen

[57] ABSTRACT

Polyether polycarbonate diols based on 1,6-hexanediol and having a molecular weight of from 500 to 12,000 are made by etherifying 50–100 mole % 1,6-hexane-diol in the presence of 0–50 mole % of specified diols and reacting the resultant polyether with a compound selected from diarylcarbonates, dialkyl carbonates, dioxolanones, hexanediol bischlorocarbonic acid esters, phosgene and urea. These diols are particularly useful in the production of polyurethanes having improved physical properties.

13 Claims, No Drawings

POLYETHER-POLYCARBONATE DIOLS AND PROCESSES FOR THEIR PRODUCTION AND USE

BACKGROUND OF THE INVENTION

This invention relates to new polyetherpolycarbonate diols based on 1,6-hexanediol and to processes for their production and use.

Aliphatic polycarbonate diols have long been known. They are prepared from non-vicinal diols by reaction with diarylcarbonate (DOS No. 1,915,908), dialkylcarbonate (DOS No. 2,555,805), dioxolanones (DOS 2,523,352), phosgene (DOS No. 1,595,446), bischlorocarbonic acid esters (DE-PS No. 857,948) or urea (P. Ball, H. Fuillmann and W. Heitz, Angew Chem. 92 1980, no. 9, pages 742, 743). Of the diols described in the literature, only those exclusively or largely based on 1,6-hexanediol have hitherto acquired any real technical significance. Thus, high-quality polyurethane elastomers and coating compositions are prepared from hexanediol polycarbonate by known methods. Outstanding resistance to hydrolysis makes the hexanediol polycarbonates particularly suitable for the production of articles having a long useful life. The hydrolysis resistance of such polyurethanes is known to be far better than that of polyurethanes based on adipic acid polyester as the diol component. Pure hexanediol polycarbonates (molecular weight 500 to 4000) are waxes having a softening point of 45° to 55° C. (according to molecular weight). As a result of the tendency towards crystallization of the soft segment, the corresponding polyurethanes tend to harden and lose their flexibility at low temperatures. To eliminate this serious disadvantage, hexanediol polycarbonates in which the softening point was lowered by incorporation of foreign components were developed. Since the relatively long chain diols suitable for this purpose were not technically available, adipic acid (DAS No. 1,964,998), caprolactone (DAS No. 1,770,245) or di-, tri- and tetraethylene glycol (DAS No. 2,221,751) were used instead. Reduction in the hydrolysis stability of the polyurethanes by the readily hydrolyzing ester groups or the hydrophilic ether segments resulted.

Another disadvantage of hexanediol polycarbonates is their relatively high intrinsic viscosity (for example, approx. 5000 mPa.s at 60° C. for a molecular weight of 2000) which leads to certain processing difficulties particularly when polyurethane production is to be carried out by the two-stage process via an isocyanate prepolymer.

High-quality polyurethanes (PU) are being increasingly used in applications where they are exposed not only to hydrolytic influences but also to attack by microorganisms. This applies, for example, to rollers in printing works or textile factories, to cable sheaths, to spring elements and vibration dampers in machine construction, to coatings for awnings, flat roofs and garden furniture and to elastomeric fibers in leisure fabrics. In these fields, polyurethanes based on aliphatic polycarbonates show a susceptibility similar to that of polyurethanes based on aliphatic polyesters.

It is known that polyurethanes based on polyethers are significantly more resistant to degradation by microorganisms. The polymers of tetrahydrofuran which are the only materials contemplated and actually used for the above-mentioned applications are in turn attended by other disadvantages. For example, their crystallinity leads to a tendency of the PU to harden at low temperatures, particularly when the desired property spectrum of the PU requires the use of soft segments having average molecular weights of 2000 and higher. The resistance of the polyether based PU to swelling both in water and in organic solvents is only moderate as is their tear propagation resistance.

U.S. Pat. No. 4,463,191 describes polyether polycarbonates corresponding to the following general formula

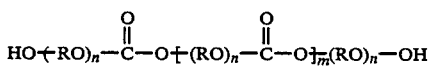

in which
R represents —CH$_2$—CH$_2$—CH$_2$—CH$_2$—
n represents 7 to 45 and
m represents 0 to 18, and processes for their production and use. More specifically, these polyether polycarbonate diols are prepared by condensation of polytetramethylene ether glycols having an average molecular weight of from 500 to 3000 (preferably from 650 to 2900) with dialkylcarbonates, cyclic carbonates or phosgene. A range for the average molecular weights of the polyether carbonates of from 828 to 51,192 is derived from the general formula. The lowest value for the ratio of ether groups to carbonate groups is 12:1 and the highest value is 46.3:1. Only slight replacement of ether groups by carbonate groups occurs in the described products. Consequently, only a slight change in the property spectrum of the polyether carbonates in relation to the pure polytetramethylene ether glycols occurs.

The same also applies to the products disclosed in U.S. Pat. No. 4,476,293 where copolyether diols of tetrahydrofuran and 10 to 80 wt. % of another cyclic alken oxide containing 2 or 3 carbon atoms in the ring (epoxides and oxetanes, molecular weight 600 to 3000) are condensed as starting materials to polycarbonates for the production of polyether carbonate diols. However, such products are unsuitable for the production of high-quality polyurethanes because experience has shown that the hydrophilic ether segments and/or lateral substituents adversely affect the performance properties of the polyurethane products to a considerable extent.

Hydroxyl-terminated polyethers based on 1,6-hexanediol have also long been known. They may be prepared by direct etherification of hexanediol using acidic catalysts such as, for example, p-toluene sulfonic acid (U.S. Pat. No. 2,492,955) or benzene- or naphthalene disulfonic acid (DAS No. 1,570,540).

The condensation reaction, which takes place at temperatures of from 150° to 200° C., is accompanied by secondary reactions and discoloration. The higher the desired average molecular weights, the greater the extent of these secondary reactions and discoloration. Obtaining the molecular weights of 1000 to 2000 which are typical and necessary in polyurethane chemistry requires long reaction times at relatively high temperature. The secondary products oxepane, hexadiene and hexanol distill off with the water of condensation so that the yield is considerably reduced (U.S. Pat. No. 2,492,955). The products may also contain terminal double bonds instead of OH groups. These terminal double bonds act undesirably as chain terminators in the synthesis of polyurethanes (U.S. Pat. No. 2,492,955).

The hexanediol polyethers are crystalline with softening points above 60° C. The polyurethanes produced from them show poor low-temperature behavior (poor low-temperature flexibility, expansion crystallization). For the reasons already mentioned, they have not hitherto acquired any technical significance.

SUMMARY OF THE INVENTION

It is an object of the present invention to provide new hydroxyl terminated polyether polycarbonates useful in producing high quality polyurethanes having improved physical properties without the disadvantages of prior art polycarbonates.

It is also an object of the present invention to provide processes for producing new hydroxyl terminated polyether polycarbonates and for using those polycarbonates.

These and other objects which will be apparent to those skilled in the art are accomplished by reacting short-chain etherification products of hexanediol with suitable derivatives of carbonic acid to form relatively long chain polyether-polycarbonate diols. These diols may then be reacted in known manner to produce polyurethanes.

DETAILED DESCRIPTION OF THE INVENTION

The present invention relates to hydroxylterminated polyether polycarbonates having molecular weights of from 500 to 12,000 (preferably from 700 to 6000), as determined by measurement of the OH value, in which hexamethylene groups and optionally up to 50 mole % of the hexamethylene groups of penta-, hepta-, octa-, nona- or deca-methylene group (preferably hexamethylene groups only), are attached statistically, alternately or blockwise by ether and carbonate groups. The ratio of ether groups to carbonate groups is from 5:1 to 1:5 and preferably from 3:1 to 1:3.

The present invention also relates to processes for the production of the new polyether polycarbonates. In a first reaction step, polyether diols having molecular weights of from 150 to 500 (preferably from 180 to 400) are prepared by etherification of 1,6-hexanediol and, optionally, 1,7-heptanediol, 1,8-octanediol, 1,9-nonanediol, but preferably 1,6-hexanediol only, by known methods or by the action of bases on corresponding mixtures of α,Ω-diols, α,Ω-halogen alcohols and α,Ω-dihalogen alkanes. In a second reaction step, the polyether diols, optionally together with 1,5-pentanediol, 1,6-hexanediol, 1,7-heptanediol, 1,8-octanediol, 1,9-nonanediol or 1,10-decanediol, but preferably the polyether diols only, and optionally in admixture with 1,6-hexanediol, are reacted in known manner with diarylcarbonates, dialkylcarbonates, dioxolanones, hexanediol bischlorocarbonic acid esters, phosgene or urea (preferably with diphenylcarbonate) to form polyether polycarbonates having molecular weights of from 500 to 12,000 (preferably from 700 to 6000). The aliphatic radicals (other than hexamethylene radicals) in the two reaction steps may make up in all at most 50 mole %.

The present invention also relates to the production of optionally foamed polyurethane plastics by reaction of relatively high molecular weight compounds containing at least two hydroxyl groups, optionally other low molecular weight diols and polyols, low molecular weight chain-extending agents and, optionally, blowing agents with di- and/or polyisocyanates by the one-shot or two-stage process, optionally in inert solvents or an aqueous emulsion, using standard auxiliaries and additives. At least 50 wt. % of the relatively high molecular weight hydroxy compounds should be the polyether polycarbonates of the present invention.

Starting materials which may be used in the production of the polyether polycarbonate diols according to the invention include polyether diols, catalysts, polyols and compounds containing carbonate groups.

Specific examples of suitable polyether diols include: 1,6-hexanediol, 1,7-heptanediol, 1,8-octanediol, 1,9-nonanediol, 1,10-decanediol, 6-chlorohexanol, 6-bromohexanol, 1,6-dichlorohexane, 1,6-dibromohexane. 1,6-hexanediol only is preferred.

Suitable catalysts for the etherification of the diols include: sulfuric acid, butanesulfonic acid, perfluorobutanesulfonic acid, benzene- and toluenesulfonic acid, benzene- and naphthalene disulfonic acids, acidic ion exchangers containing sulfonic acid groups and acidic aluminas. The preferred catalyst is naphthalene-1,5-disulfonic acid which is used in quantities of from 0.1 to 2 wt. % and preferably in quantities of from 0.2 to 1 wt. %

Polyols useable in the second reaction stage, optionally together with the polyethers of the first reaction stage include: 1,5-pentanediol, 1,6-hexanediol, 1,7-heptanediol, 1,8-octanediol, 1,9-nonanediol, 1,10-decanediol, oligomers of ethylene oxide and 1,2-propylene oxide, such as di-, tri- and tetraethylene glycol and di- and tetrapropylene glycol. Small quantities of trimethylolethane and propane and also pentaerythritol may also be used for branching. It is preferred not to use any of these polyols or only 1,6-hexanediol.

Compounds which may be used for reaction with the polyethers of the first reaction stage include: diaryl carbonates such as diphenyl, ditolyl, dixylyl and dinaphthylcarbonate; dialkylcarbonates such as diethyl, dipropyl, dibutyl, diamyl and dicyclohexylcarbonate; dioxolanones such as ethylene and propylene carbonate; 1,6-hexanediol bischlorocarbonic acid esters; phosgene and urea. Diphenylcarbonate is preferably used.

The polyether polycarbonates of the invention may generally be prepared as follows:

Hexanediol, optionally in admixture with one of the α,Ω-diols mentioned, is heated with the catalyst, preferably naphthalene-1,5-disulfonic acid, to 150° to 200° C. The quantity of water corresponding to the desired molecular weight (150 to 490) is distilled off in 3 to 16 hours, depending upon the temperature and the quantity of catalyst used. The condensation may be carried out at normal pressure. In this case, nitrogen is passed over or an inert gas ($N_2$ or $CO_2$) is introduced into the melt and/or an entraining agent is used to remove the water by azeotropic distillation or in vacuo (50–200 mbar). Oxepane (hexamethylene oxide) distills off as secondary product with the water of condensation and the entraining agent used, if any, in a quantity of 2 to 6 mole % of the hexanediol used, depending upon the condensation time and temperature.

The lowest level of secondary product formation and also the best color values for the polyethers are obtained when the water is removed by azeotropic distillation. The entraining agents used may be, for example, toluene, xylylene, gasoline fractions, cyclohexane and chlorobenzene. Oxepane itself is particularly suitable because its presence somewhat suppresses its further formation from hexanediol. The quantity in which the entraining agent is used is gauged in such a way that the reaction mixture is kept boiling at the reaction temperature. As far as the quality and yield of the polyethers are concerned, it is more favorable to carry out the reaction at lower temperatures over longer reaction times (for example 170° C./16 hours).

After the desired degree of condensation (which may be determined from the quatity of water distilled off) has been reached, the reaction mixture is cooled to below 100° C. and boiled under reflux for 1 to 3 hours with 5 to 10 wt. % water to hydrolyze any sulfonic acid ester groups formed. The acidic catalyst is then neutralized with aqueous alkali or with ammonia. After water, solvent and ring ether have been evaporated off in vacuo, the solid insoluble salts of sulfonic acid are filtered off.

Pale yellow-colored liquids or low-melting waxes having molecular weights of from 150 to 500 (preferably from 180 to 400) as determined from the OH value, are obtained. The polyethers may optionally be separated by distillation or fractional extraction into 1,6-hexanediol, $\Omega,\Omega$-dihydroxy-dihexylether and higher oligomers.

It is also possible to adjust the molecular weight of the polyethers to a desired higher value by distilling off some of the unreacted hexanediol.

The polyethers are then condensed with diphenylcarbonate in the second reaction stage at temperatures of from 120° to 220° C. (preferably at temperatures of from 130° to 200° C.) and under pressure of from 200 to 1 mbar with removal of phenol by distillation. The polyether from the first stage may be used for this purpose, optionally after one of the above-described pretreatments and/or after mixing with hexanediol and/or optionally another polyol. The carbonate-forming compound is used in a defined deficit so that the desired molecular weight is derived in accordance with the following equation:

$$MW \text{ (polycarbonate)} = n \times MW \text{ (diol)} + (n-1) \times 26$$

where n is the number of moles of the diol used and (n-1) is the number of moles of the carbonate-forming compound used. 26 is the molecular weight of the carboxyl group reduced by 2.

The reaction in the second reaction stage may be catalyzed by bases or transition metal compounds.

The polyether polycarbonates obtained are relatively low-viscosity liquids or low-melting waxes. Where 1,6-hexanediol only is used as the polyol component, the softening points of the resulting polyether polycarbonates depend upon the ratio of carbonate groups to ether groups. Where this ratio is approximately 1.25:1, a melting point minimum is reached at 18° to 22° C. (depending upon molecular weight). These products are liquid at room temperature and more easy to handle. They are the preferred polyether carbonates of the present invention.

The polyether polycarbonates of the present invention may be processed to form PU plastics which are characterized by favorable properties. Besides the favorable processing properties of the polyether polycarbonates attributable to their relatively low viscosity (especially where they are processed to polyisocyanate prepolymers), they give polyurethanes having very good elasticity, tensile strength, tear propagation resistance and elongation at break. They also produce polyurethanes having good flexibility at low temperatures and very low glass transition temperatures. Polyurethanes such as these are also obtained where polyether polycarbonates having softening points above 30° C. are used. Polyurethanes produced from the polyether polycarbonate diols of the present invention show high resistance to hydrolysis and bacterial degradation.

To produce the polyurethane plastics, compounds which may be used in addition to the polyether polycarbonates of the present invention include relatively high molecular weight hydroxyl compounds containing at least two isocyanate-reactive hydrogen atoms and having a molecular weight of generally of from 400 to 10,000. In addition to compounds containing amino groups, thiol groups or carboxyl groups, compounds such as these are preferably compounds containing hydroxyl groups, particularly compounds containing from 2 to 8 hydroxyl groups, above all those having molecular weights of from 500 to 8000 (preferably from 700 to 6000). Specific examples of these compounds include: polyesters, polyethers, polythioethers, polyacetals, polycarbonates and polyester amides containing at least 2, generally from 2 to 8, but preferably from 2 to 4 hydroxyl groups, of the type known to be useful for the production of homogeneous and cellular polyurethanes.

Polyesters containing hydroxyl groups suitable for use in accordance with the present invention include reaction products of polyhydric, preferably dihydric and, optionally, trihydric alcohols with polybasic, preferably dibasic, carboxylic acids. Instead of using the free polycarboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic and/or heterocyclic and may optionally be substituted (for example by halogen atoms) and/or unsaturated.

Examples of carboxylic acids and their derivatives include: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimerized and trimerized unsaturated fatty acids, optionally in admixture with monomeric unsaturated fatty acids (such as oleic acid) terephthalic acid dimethyl ester and terephthalic acid-bis-glycol ester. Suitable polyhydric alcohols include: ethylene glycol, 1,2- and 1,3-propylene glycol, 1,4- and 2,3-butylene glycol, 1,6-hexane diol, 1,8-octane diol, neopentyl glycol, 1,4-bis-hydroxymethyl cyclohexane, 2-methyl-1,3-propane diol, glycerol, trimethylol propane, 1,2,6-hexane triol, 1,2,4-butane triol, trimethylol ethane, pentaerythritol, qunintol, mannitol and sorbitol, formitol, methyl glycoside, also diethylene glycol, triethylene glycol, tetraethylene glycol and higher polyethylene glycols, dipropylene glycol and higher polypropylene glycols, dibutylene glycol and higher polybutylene glycols. The polyesters may contain terminal carboxyl groups. Polyesters of lactones (for example $\epsilon$-caprolactone) or of hydroxy carboxylic acids (for example $\omega$-hydroxy caproic acid) may also be used.

Polyethers containing at least 2, generally 2 to 8 and preferably 2 to 3 hydroxyl groups suitable for use in the practice of the present invention are also known. These polyethers may be obtained by polymerizing epoxides, such as ethylene oxide, propylene oxide, butylene oxide, tetrahydrofuran, styrene oxide or epichlorohydrin on their own (for example, in the presence of Lewis catalysts such as BF₃) or by the addition of these epoxides (preferably ethylene oxide and propylene oxide, optionally in admixture or successively) with starter components containing reactive hydrogen atoms, such as water, alcohols, ammonia or amines. Examples of suitable starter components include: ethylene glycol, 1,3-propylene glycol, 1,2-propylene glycol, trimethylol propane, glycerol, sorbitol, 4,4'-dihydroxy diphenyl propane, aniline, ethanolamine and ethylene diamine. Sucrose polyethers of the type described for example in German Auslegeschriften Nos. 176,358 and 1,064,938 and formitolor formose-started polyethers (German Offenlegungsschriften Nos. 2,639,083 and 2,737,951) may also be used. In many cases, it is preferred to use polyethers which predominantly contain primary OH-groups (up to 90 wt. %, based on all the OH-groups present in the polyether). Polybutadienes containing OH-groups are also suitable for use in accordance with the present invention.

Among the suitable polythioethers, the condensation products of thiodiglycol on its own and/or with other glycols, dicarboxylic acids, formaldehyde, aminocarboxylic acids or amino alcohols are referred. Depending upon the co-component, the condensation product may be a mixture of polythioethers, polythioether esters or polythioether ester amides.

Suitable polyacetals include the compounds obtainable from glycols such as diethylene glycol, triethylene glycol, 4,4'-dioxethoxy diphenyl dimethyl methane, hexane diol and formaldehyde. Polyacetals suitable for use in accordance with the invention may also be obtained by polymerizing cyclic acetals such as trioxane (German Offenlegungsschrift No. 1,694,128).

Suitable polycarbonates containing hydroxyl groups are known and may be obtained by reacting diols (such as 1,3-propane diol, 1,4-butane diol and/or 1,6-hexane diol, diethylene glycol, triethylene glycol, tetraethylene glycol or thiodiglycol) with diaryl carbonates (for example diphenyl carbonate) or phosgene (German Auslegeschriften Nos. 1,694,080; 1,915,908 and 2,221,751; German Offenlegungsschrift No. 2,605,024).

Suitable polyester amides and polyamides include the predominantly linear condensates obtained from polybasic saturated or unsaturated carboxylic acids or their anhydrides and polyhydric saturated or unsaturated amino alcohols, diamines, polyamines and mixtures thereof.

Polyhydroxyl compounds already containing urethane or urea groups and optionally modified natural polyols, (such as castor oil) or carbohydrates (for example, starch) may also be used. Addition products of alkylene oxides with phenol-formaldehyde resins or even with urea-formaldehyde resins may also be used in accordance with the invention.

Before they are used in the polyisocyanatepolyaddition process, the above-mentioned polyhydroxyl compounds may be modified in various ways. For example, according to German Offenlegungsschriften No. 2,210,839 (U.S. Pat. No. 3,849,515) and 2,544,195, a mixture of different polyhydroxyl compounds (for example a polyether polyol and a polyester polyol) may be condensed by etherification in the presence of a strong acid to form a relatively high molecular weight polyol which is made up of different segments attached through ether bridges. It is also possible according to German Offenlegungsschrift No. 2,559,372 to introduce amide groups into the polyhydroxyl compounds. German Offenlegungsschrift No. 2,,620,487 discloses polyhydroxyl compounds containing triazine groups formed by reaction with polyfunctional cyanic acid esters. The reaction of a polyol with a less than equivalent quantity of a diisocyanatocarbodiimide, followed by reaction of the carbodiimide group with an amine, amide, phosphite or carboxylic acid, gives polyhydroxyl compounds containing guanidine, phosphonoformamidine or acyl urea groups (German Offenlegungsschriften Nos. 2,714,289; 2,714,292 and 2,714,293). In some cases, it is of particular advantage to completely or partly convert the relatively high molecular weight polyhydroxyl compounds into the corresponding anthranilic acid esters by reaction with isatoic acid anhydride as described in German Offenlegungsschriften Nos. 2,019,432 and 2,619,840 and in U.S. Pat. Nos. 3,808,250; 3,975,428 and 4,016,143. Relatively high molecular weight compounds containing terminal aromatic amino groups may be obtained in this way.

According to German Offenlegungsschrift No. No. 2,546,536 and U.S. Pat. No. 3,865,791, relatively high molecular weight compounds containing terminal amino groups are obtained by reacting NCO prepolymers with enamines, aldimines or ketimines containing hydroxyl groups and hydrolyzing the reaction product. Other processes for producing relatively high molecular weight compounds containing terminal amino groups or hydrazide groups are described in German Offenlegungsschrift No. 1,694,152 (U.S. Pat. No. 3,625,871).

It is also possible to use polyhydroxyl compounds containing high molecular weight polyadducts and polycondensates or polymers in finely disperse or dissolved form in the practice of the present invention. Polyhydroxyl compounds such as these may be obtained by carrying out polyaddition reactions (for example reactions between polyisocyanates and aminofunctional compounds) and polycondensation reactions (for example between formaldehyde and phenols and/or amines) in situ in the above-mentioned compounds containing hydroxyl groups. Processes such as these are described for example in German Auslegeschriften Nos. 168,075 and 1,260,142 and in German Offenlegungsschriften Nos. 2,324,134: 2,423,984; 2,512,385; 2,513,815; 2,550,796; 2,550,797: 2,550,833; 2,550,862; 2,633,293 and 2,639,254. However, it is also possible, in accordance with U.S. Pat. No. 3,869,413 or German Offenlegungsschrift No. 2,550,860, to mix an aqueous polymer dispersion with a polyhydroxyl compound and subsequently to remove the water from the mixture.

Polyhydroxyl compounds modified by vinyl polymers of the type obtained by polymerizing styrene and acrylonitrile in the presence of polyethers (U.S. Pat. Nos. 3,383,351; 3,304,273: 3,523,093 and 3,110,695; German Auslegeschrift No. 1,152,536) or polycarbonate polyols (German Pat. No. 1,769,795: U.S. Pat. No. 3,637,909) are also suitable for use in the process of the present invention. Plastics having particularly good flame resistance properties are obtained by using polyether polyols modified in accordance with German Offenlegungsschriften Nos. 2,442,101: 2,644,922 and 2,646,141 by graft polymerization with vinyl phosphonic acid esters and, optionally, (meth)acrylonitrile, (meth)acrylamide or OH-functional (meth)acrylic acid esters. Polyhydroxyl compounds into which carboxyl groups have been introduced by radical graft polymerization with unsaturated carboxylic acids and, optionally, other olefinically unsaturated monomers (German Offenlegungsschriften Nos. 2,714,291; 2,739,620 and 2,654,746) may be used with particular advantage in combination with mineral fillers.

Where modified polyhydroxyl compounds of the type mentioned above are used as a starting component in the polyisocyanate-polyaddition process, polyurethane plastics having considerably improved mechanical properties are formed.

Representatives of the above-mentioned compounds used in accordance with the invention are described for example in High Polymers, Vol. XVI, "Polyurethanes, Chemistry and Technology", by Saunders-Frisch, Interscience Publishers, New York/London, Vol. I, 1962, pages 32 to 42 and pages 44 to 54 and Vol. II, 1964, pages 5–6 and 198–199, and in Kunststoff-Handbuch, Vol. VII, Vieweg-Hochtlen, Carl-Hanser-Verlag, Munich, 1966, for example on pages 45 to 71. It is of course possible to use mixtures of the above-mentioned compounds containing at least two isocyanate-reactive hydrogen atoms and having a molecular weight of from 400 to 10,000 (for example, mixtures of polyethers and polyesters).

In some cases, it is of particular advantage to combine low-melting and high-melting polyhydroxyl compounds with one another (German Offenlegungsschrift No. 2,706,297). Optional low molecular weight chain extenders compounds containing at least two isocyanate-reactive hydrogen atoms and having a molecular weight of from 32 to 400 may also be used in the production of polyurethanes by the process of the present invention. These compounds which serve as chain extenders or crosslinkers contain hydroxyl groups and/or amino groups and/or thiol groups and/or carboxyl groups, preferably hydroxyl groups and/or amino groups. These compounds gnerally contain from 2 to 8 and preferably from 2 to 4 isocyanate-reactive hydrogen atoms. It is possible to use mixtures of different compounds containing at least two isocyanate-reactive hydrogen atoms and having a molecular weight in the range from 32 to 400.

Specific examples of such compounds include: ethylene glycol, 1,2- and 1,3-propylene glycol, 1,4- and 2,3-butylene glycol, 1,5-pentane diol, 1,6-hexane diol, 1,8-octane diol, neopentyl glycol, 1,4-bishydroxymethyl cyclohexane, 2-methyl-1,3-propane diol, dibromobutene diol (U.S. Pat. No. 3,723,392), glycerol, trimethylol propane, 1,2,6-hexane triol, trimethylol ethane, pentaerythritol, quinitol, mannitol and sorbitol, castor oil, diethylene glycol, triethylene glycol, tetraethylene glycol, higher polyethylene glycols having a molecular weight of up to 400, dipropylene glycol, higher polypropylene glycols having a molecular weight of up to 400, dibutylene glycol, higher polybutylene glycols having a molecular weight of up to 400, 4,4'-dihydroxy diphenyl propane, dihydroxy methyl hydroquinone, ethanolamine, diethanolamine, N-methyl diethanolamine, triethanolamine and 3-aminopropanol.

Other low molecular weight polyols suitable for the purposes of the invention are mixtures of hydroxy aldehydes and hydroxy ketones ("formose") or polyhydric alcohols obtained thrrefrom by reduction ("formitol") which are formed in the autocondensation of formaldehyde hydrate in the presence of metal compounds as catalysts and compounds capable of enediol formation as co-catalysts (German Offenlegungsschriften Nos. 2,639,084; 2,714,084; 2,714,104; 2,721,186; 2,738,154 and 2,714,512). In order to obtain plastics with improved flame resistance, these formoses are advantageously used in combination with aminoplast formers and/or phosphites (German Offenlegungsschriften Nos. 2,738,513 and 2,738,532). Solutions of polyisocyanate polyaddition products, particularly solutions of polyurethane ureas containing ionic groups and/or solutions of polyhydrazodicarbonamides in low molecular weight polyhydric alcohols may also be used as a polyol component in accordance with the present invention (German Offenlegungsschrift No. 2,638,759).

Suitable aliphatic diamines include: ethylene diamine, 1,4-tetramethylene diamine, 1,11-undecamethylene diamine, 1,12-dodecamethylene diamine and mixtures thereof, 1-amino-3,3,5-trimethyl-5-aminomethyl cyclohexane ("isophoronediamine"), 2,4- and 2,6-hexahydrotolylene diamine and mixtures thereof, perhydro-2,4'- and -4,4'-diaminodiphenyl methane, p-xylylene diamine, bis-(3-aminopropyl)-methylamine, diaminoperhydroanthracenes (German Offenlegungsschrift No. 2,638,731) and cycloaliphatic triamines (German Offenlegungsschrift No. 2,614,244). It is also possible to use hydrazine and substituted hydrazines such as methyl hydrazine, N,N'-dimethyl hydrazine and their homologs; acid dihydrazides such as carbodihydrazide, oxalic acid dihydrazide, the dihydrazides of malonic acid, succinic acid, glutaric acid, adipic acid, β-methyl adipic acid, sebacic acid, hydracrylic acid and terephthalic acid; semicarbazido alkylene hydrazides such as β-semicarbazido propionic acid hydrazide (German Offenlegungsschrift No. 1,770,591); semicarbazido alkylene carbazinic esters such as 2-semicarbazido ethyl carbazinic ester (German Offenlegungsschrift No. 1,918,504) and aminosemicarbazide compounds such as β-aminoethyl semicarbazido carbonate (German Offenlegungsschrift No. 1,902,931). To control their reactivity, the amino groups may be completely or partly blocked by aldimine or ketimine groups (U.S. Pat. No. 3,734,894: German Offenlegungsschrift No. 2,637,115).

Examples of appropriate aromatic diamines include bis-anthranilic acid esters (German Offenlegungsschriften Nos. 2,040,644 and 2,160,590); 3,5- and 2,4-diaminobenzoic acid esters (German Offenlegungsschrift No. 2,025,900): the diamines containing ester groups described in German Offenlegungsschriften No. 1,803,635 (U.S. Pat. Nos. 3,681,290 and 3,736,350), 2,040,650 and 2,160,589: diamines containing ether groups (German Offenlegungsschriften Nos 1,770,525 and 1,809,172 (U.S. Pat. Nos. 3,654,364 and 3,736,295)); 2-halogen-1,3-phenylene diamines optionally substituted in the 5-position (German Offenlegungsschriften Nos. 2,001,772; 2,025,896 and 2,065,869): 3,3'-dichloro-4,4'-diaminodiphenyl methane: tolylene diamine; 4,4'-diaminodiphenyl methane: 4,4'-diaminodiphenyl disulfides (German Offenlegungsschrift No. 2,404,976); diaminodiphenyl dithioethers (German Offenlegungsschrift No. 2,509,404): aromatic diamines substituted by alkyl thio groups (German Offenlegungsschrift No. 2,638,760); diaminobenzene phosphonic acid esters (German Offenlegungsschrift No. 2,459,491); aromatic diamines containing sulfonate or carboxylate groups (German Offenlegungsschrift No. 2,720,166) and the high-melting diamines described in German Offenlegungsschrift No. 2,635,400. Examples of aliphatic-aromatic diamines are the aminoalkyl thioanilines according to German Offenlegungsschrift No. 2,734,574.

Other suitable chain extenders include: 1-mercapto-3-aminopropane, optionally substituted amino acids such as glycine, alanine, valine, serine and lysine and optionally substituted dicarboxylic acids such as succinic acid, adipic acid, phthalic acid, 4-hydroxy phthalic acid and 4-aminophthalic acid.

In addition, isocyanate-monofunctional compounds may be used as so-called chain terminators in proportions of from 0.01 to 10 wt. %, based on polyurethane. Such monofunctional compounds include monoamines such as butyl and dibutylamine, octylamine, stearylamine, N-methyl stearylamine, pyrrolidine, piperidine and cyclohexylamine and monoalcohols such as butanol, 2-ethyl hexanol, octanol, dodecanol, the various amyl alcohols, cyclohexanol and ethylene glycol monoethyl ether.

Other polyols having a molecular weight of up to 400 suitable for use in accordance with the present invention include ester diols corresponding to the general formulae

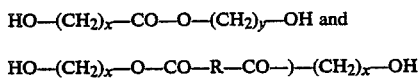

in which
R represents an alkylene radical containing from 1 to 10 (preferably from 2 to 6) C-atoms or a cycloalkylene or arylene radical containing from 6 to 10 C-atoms,
x represents a number from 2 to 6 and
y represents a number from 3 to 5.

Specific examples of such diols include: δ-hydroxybutyl-ε-hydroxycaproic acid ester, ω-hydroxylhexyl-γ-hydroxybutyric acid ester, adipic acid bis-(β-hydroxylethyl)-ester and terephthalic acid bis-(β-hydroxyethyl)-ester. Diol urethanes corresponding to the general formula

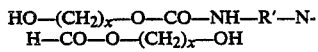

in which
R' represents an alkylene radical containing from 2 to 15 (preferably from 2 to 6) C-atoms or a cycloalkylene or arylene radical containing from 6 to 15 C-atoms and x represents an integer of from 2 to 6 may also be used. Specific examples of these diols include: 1,6-hexamethylene-bis-(β-hydroxyethylurethane) and 4,4'-diphenylmethane-bis-(β-hydroxybutylurethane). Diol urethanes corresponding to the general formula

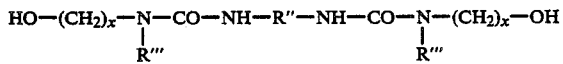

in which
R" represents an alkylene radical containing from 2 to 15 (preferably from 2 to 9) C-atoms or a cycloalkylene or arylene radical containing from 6 to 15 C-atoms,
R''' represents hydrogen or a methyl group and x represents the number 2 or 3 are also useful as chain terminators. Specific examples include 4,4'-diphenylmethane-bis-(β-hydroxyethylurea) and the compound

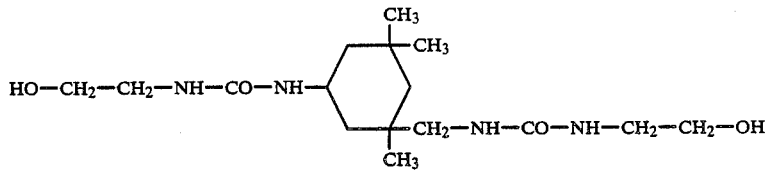

For some purposes, it is advantageous to use polyols containing sulfonate and/or phosphonate groups (DE-OS No. 2,719,372), preferably the adduct of bisulphite with 1,4-butanediol or alkoxylation products thereof.

Di- and/or polyisocyanates useful in the production of polyurethanes in accordance with the present invention include: aliphatic, cycloaliphatic, araliphatic, aromatic and heterocyclic polyisocyanates of the type described for example by W. Siefken in Justus Liebigs Annalen der Chemie, 562, pages 75 to 136. Such isocyanates include those corresponding to the formula Q (NCO)$_n$ in which: n represents 2–4, preferably 2, and Q represents an aliphatic hydrocarbon radical containing from 4 to 18 carbon atoms (preferably from 10) carbon atoms, a cycloaliphatic hydrocarbon radical containing from 4 to 15 (preferably from 5 to 10) carbon atoms, an aromatic hydrocarbon radical containing from 6 to 15 carbon atoms (preferably from 6 to 13 carbon atoms), or an araliphatic hydrocarbon radical containing from 8 to 15 carbon atoms (preferably from 8 to 13 carbon atoms). Specific examples include: ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and 1,4-diisocyanate and mixtures of these isomers, 1-isocyanato-3,3,5-trimethyl-5-isocyanatomethyl cyclohexane (German Auslegeschrift No. 1,202,785, U.S. Pat. No. 3,401,190), 2,4- and 2,6-hexahydrotolylene diisocyanate and mixtures of these isomers, hexahydro-1,3- and/or 1,4-phenylene diisocyanate, perhydro-2,4'- and/or -4,4'-diphenylmethane diisocyanate, 1,3- and 1,4-phenylene diisocyanate, 2,4- and 2,6-tolylene diisocyanate and mixtures of these isomers, diphenylmethane-2,4'- and/or -4,4'-diisocyanate and naphthylene-1,5-diisocyanate.

It is also possible to use triphenylmethane-4,4',4"-triisocyanate; polyphenyl polymethylene polyisocyanates of the type obtained by condensing aniline with formaldehyde, followed by phosgenation (described, for example, in British Pat. Nos. 874,430 and 848,671): m- and p-isocyanatophenyl sulfonyl isocyanates (U.S. Pat. No. 3,454,606); perchlorinated aryl polyisocyanates of the type described for example in German Auslegeschrift No. 1,157,601 (U.S. Pat. No. 3,277,138): polyisocyanates containing carbodiimide groups of the type described in German Pat. No. 1,092,007 (U.S. Pat. No. 3,152,162) and in German Offenlegungsschriften Nos. 2,504,400: 2,537,685 and 2,552,250: norbornane diisocyanates (U.S. Pat. No. 3,492,330); polyisocyanates containing allophanate groups of the type described in British Pat. No. 994,890, in Belgian Pat. No. 761,626 and in the published Dutch Patent Application No. 7,102,524; polyisocyanates containing isocyanurate groups of the type described in U.S. Pat. No. 3,001,973, in German Pat. Nos. 1,022,789; 1,222,067 and 1,027,394 and in German Offenlegungsschriften Nos. 1,929,034 and 2,004,048; polyisocyanates containing urethane groups of the type described in Belgian Pat. No. 752,261 or in U.S. Pat. Nos. 3,394,164 and 3,644,457: polyisocyanates containing acylated urea groups (German Pat. No. 1,230,778); described in U.S. Pat. Nos. 3,124,605; 3,201,372 and 3,124,605 and in British Pat. No. 889,050: polyisocyanates produced by telomerization reactions of the type described in U.S. Pat. No. 3,654,106; polyisocyanates containing ester groups of the type described in British Pat. Nos. 965,474 and 1,072,956, in U.S. Pat. Nos. 3,567,763 and in German Pat. No. 1,231,688; reaction products of the above-mentioned diisocyanates with acetals (German Pat. No. 1,072,385) and polyisocyanates containing polymeric fatty acid esters (U.S. Pat. No. 3,455,883).

It is also possible to use the isocyanate-group-containing distillation residues obtained in the commercial production of isocyanates, optionally in solution in one or more of the above-mentioned polyisocyanates. It is also possible to use any mixtures of the above-mentioned polyisocyanates.

In general, it is particularly preferred to use the commercially readily available polyisocyanates such as 2,4- and 2,6-tolylene diisocyanate and mixtures of these isomers ("TDI"), polyphenyl polymethylene polyisocyanates of the type obtained by condensing aniline with formaldehyde, followed by phosgenation ("crude MDI") and polyisocyanates containing carbodiimide groups, urethane groups, allophanate groups, isocyanurate groups, urea groups or biuret groups ("modified polyisocyanates"). Modified polyisocyanates of the type derived from 2,4- and/or 2,6-tolylene diisocyanate and from 4,4'- and/or Z,4'-diphenylmethane diisocyanate are preferred. Naphthalene-1,5-diisocyanate, 4,4'-diphenylmethane diisocyanate and tolylene diisocyanate (80% 2,4- and 20% 2,6-isomer) are particularly preferred.

Optional additives and auxiliaries useful in the practice of the present invention include water Optional additives and auxiliaries useful in the practice of the present invention include water and/or readily volatile inorganic or organic substances which act as blowing agents. Organic blowing agents include acetone, ethyl acetate, halogensubstituted alkanes, such as methylene chloride, chloroform, ethylidene chloride, vinylidene chloride, monofluorotrichloromethane, chlorodifluoromethane, dichlorodifluoromethane and butane, hexane, heptane and diethyl ether. Inorganic blowing agents are, for example, air, $CO_2$ and $N_2O$. A blowing effect may also be obtained by adding compounds which decompose at a temperature above room temperature giving off gases (such as nitrogen). Azo compounds such as azodicarbonamide and azoisobutyronitrile are examples. Other examples of blowing agents and information on the use of blowing agents can be found in Kunststoff-Handbuch, Vol. VII, by Vieweg and Hochtlen, Carl-Hanser-Verlag, Munich, 1966, for example on pages 108 to 109, 453 to 455 and 507 to 510.

Known catalysts such as tertiary amines may be employed. Examples of suitable amine catalysts include: triethylamine, tributylamine, N-methyl morpholine, N-ethyl morpholine, N,N,N',N'-tetramethyl ethylene diamine, pentamethyl diethylene triamine and higher homologs (German Offenlegungsschriften Nos. 2,624,527 and 2,624,528), 1,4-diazabicyclo-(2,2,2)-octane, N-methyl-N'-dimethylaminoethyl piperazine, bis-(dimethylaminoalkyl)-piperazines (German Offenlegungsschrift No. 2,636,787), N,N-dimethyl benzylamine, N,N-dimethyl cyclohexylamine, N,N-diethyl benzylamine, bis-(N,N-diethylaminoethyl)-adipate, N,N,N',N'-tetramethyl-1,3-butane diamine, N,N-dimethyl-β-phenyl ethylamine, 1,2-dimethyl imidazole, 2-methyl imidazole, monocyclic and bicyclic amidines (German Offenlegungsschrift No. 1,720,633), bis-(dialkylamino)alkyl ethers (U.S. Pat. No. 3,330,782, German Auslegeschrift No. 1,030,558, German Offenlegungsschriften Nos. 1,804,361 and 2,618,280)aand tertiary amines containing amide groups (preferably formamide groups) according to German Offenlegungsschriften Nos. 2,523,633 and 2,732,292. Suitable catalysts also include known Mannich bases of secondary amines (e.g. dimethylamine), aldehydes (preferably formaldehyde), ketones (such as acetone, methylethyl ketone and cyclohexanone) and phenols (such as phenol, nonyl phenol and bisphenol).

Tertiary amines containing isocyanate-reactive hydrogen atoms suitable for use as catalysts include: triethanolamine, triisopropanolamine, N-methyl diethanolamine, N-ethyl diethanolamine, N,N-dimethyl ethanolamine, their reaction products with alkylene oxides (such as propylene oxide and/or ethylene oxide) and also secondary-tertiary amines according to German Offenlegungsschrift No. 2,732,292.

Other suitable catalysts are sila-amines containing carbon-silicon bonds of the type described in German Pat. No. 1,229,290 (corresponding to U.S. Pat. No. 3,620,984) such as 2,2,4-trimethyl-2-silamorpholine and 1,3-diethylaminomethyl tetramethyl disiloxane.

Other suitable catalysts are nitrogencontaining bases such as tetraalkyl ammonium hydroxides, alkali hydroxides such as sodium hydroxide, alkali phenolates such as sodium phenolate and alkali alcoholates such as sodium methylate. Hexahydrotriazines may also be used as catalysts (German Offenlegungsschrift No. 1,769,043).

The reaction between NCO-groups and Zerewitinoff-active hydrogen atoms is also greatly accelerated by lactams and azalactams where a complex between the lactam and the compound containing acid hydrogen initially is formed. Complexes such as these and their catalytic effect are described in German Offenlegungsschriften Nos. 2,062,286: 2,062,288: 2,117,576 (U.S. Pat. No. 3,758,444); 2,129,198; 2,330,175 and 2,330,211.

It is also possible to use organometallic compounds particularly organo tin compounds, as catalysts. In addition to sulfur-containing compounds such as di-n-octyl tin mercaptide (German Auslegeschrift No. 1,769,367; U.S. Pat. No. 3,654,927), preferred organotin compounds are tin(II)salts of carboxylic acids such as tin(II)acetate, tin(II)octoate, tin(II)ethyl hexoate and tin(II)laurate and tin(IV) compounds such as dibutyl tin oxide, dibutyl tin dichloride, dibutyl tin diacetate, dibutyl tin dilaurate, dibutyl tin maleate and dioctyl tin diacetate.

All of the above-mentioned catalysts may of course be used in the form of mixtures. In this respect, combinations of organometallic compounds and amidines, aminopyridines or hydrazino pyridines (German Offenlegungsschriften Nos. 2,434,185; 2,601,082 and 2,603,834) are of particular interest.

Other catalysts suitable for use in accordance with the invention and information on the way in which they work can be found in Kunststoff-Handbuch by Vieweg and Hochtlen, Vol. VII, Carl-Hanser-Verlag, Munich 1966, for example on pages 96 to 102.

The catalysts are generally used in a quantity of from about 0.001 to 10 wt. % based on the total quantity of compounds containing at least two isocyanate-reactive hydrogen atoms.

Surface-active additives such as emulsifiers and foam stabilizers may also be used in the production of polyurethanes in accordance with the present invention. Suitable emulsifiers include the sodium salts of castor oil sulfonates and salts of fatty acids with amines such as diethylamine oleate and diethanolamine stearate. Alkali and ammonium salts of sulfonic acids such as dodecyl benzene sulfonic acid and dinaphthyl methane disulfonic acid, salts of fatty acids such as ricinoleic acid and salts of polymeric fatty acids may also be used as surface-active additives.

Suitable foam stabilizers include polyether siloxanes, particularly the water soluble types. The structure of these compounds is generally such that a copolymer of ethylene oxide and propylene oxide is attached to a polydimethyl siloxane residue. Foam stabilizers such as these are described for example in U.S. Pat. Nos. 2,834,748; 2,917,480 and 3,629,308. In many cases, polysiloxane-polyoxyalkylene copolymers branched through allophanate groups according to German Offenlegungsschrift No. 2,558,523 are of particular interest.

Reaction retarders, for example, acid-reacting substances such as hydrochloric acid or organic acid halides; known cell regulators such as paraffins and fatty alcohols and dimethyl polysiloxanes: pigments and dyes: known flameproofing agents such as tris-chloroethyl phosphate, tricresyl phosphate and ammonium phosphate and polyphosphate; stabilizers against the effects of ageing and weather; plasticizers: fungistatic and bacteriostatic substances as well as fillers such as barium sulfate, kieselguhr, carbon black and whiting may also be used in the production of polyurethanes in accordance with the present invention.

Further examples of surface-active additives, foam stabilizers, cell regulators, reaction retarders, stabilizers, flameproofing agents, plasticizers, dyes, fillers, fungistatic and bacteriostatic substances which may optionally be used in accordance with the invention and information on the way in which these additives are used and on their respective modes of action can be found in Kunststoff-Handbuch by Vieweg and Hochtlen, Vol. VII, Carl-Hanser-Verlag, Munich 1966, for example on pages 103 to 113.

To produce polyurethane plastics, the reaction components are reacted by the known one-shot process, by the prepolymer process or by the semiprepolymer process. In many cases, machines of the type described in U.S. Pat. No. 2,764,565 are used. Particulars of other processing machines which may also be used in accordance with the invention can be found in Kunststoff-Handbuch by Vieweg and Hochtlen, Vol. VII, Carl-Hanser-Verlag, Munich, 1966, for example on pages 121 to 205.

In the production of foams, it is possible to carry out foaming in closed molds. To this end, the reaction mixture is introduced into a mold. Suitable mold materials include metals such as aluminum and plastics such as epoxide resins. The foamable reaction mixture foams in the mold and forms the molding. In-mold foaming may be carried out in such a way that the molding has a cellular structure at its surface, although it may also be carried out in such a way that the molding has a compact skin and a cellular core. It is possible in accordance with the invention to introduce foamable reaction mixture into the mold in such a quantity that the foam formed just fills the mold. However, it is also possible to introduce into the mold more foamable reaction mixture than is required for filling the interior of the mold with foam. This latter technique is known as overcharging and is disclosed in U.S. Pat. Nos. 3,178,490 and 3,182,104.

In may cases, known "external release agents" such as silicone oils are used for in-mold foaming. However, it is also possible to use so-called "internal release agents", optionally in admixture with external release agents, of the type disclosed in German Offenlegungsschriften Nos. 2,121,670 and 2,307,589.

It is possible to produce cold-hardening foams (British Pat. No. 1,162,517 and German Offenlegungsschrift No. 2,153,086). However, it is also possible to produce foams by block foaming or by the known laminator process.

The polyurethane products obtainable in accordance with the invention may be used for roller coverings, hydrocyclones, pipe linings and wear prevention in aqueous media.

The invention is further illustrated but is not intended to be limited by the following examples in which all parts and percentages are by weight unless otherwise specified

EXAMPLES

Polyether I

In a 100 liter stirring vessel of V4A steel equipped with a regulated steam jacket heating system, a column and an azeotropic separator, 70.8 kg (600 moles) 1,6-hexanediol, 0.5 kg sulfuric acid and 3.5 liters toluene were heated to boiling temperature. Beyond a sump temperature of 160° C., water began to be separated in the distillate. The sump temperature was kept constant at 170° C. by adjusting the quantity of toluene. 6.41 kg (356 moles) water of condensation were obtained over a period of 11 hours. After cooling to 90° C., the reaction mixture was stirred for 3 hours with 5 liters water. After neutralization with 20% sodium hydroxide to pH 7, all volatile constituents were distilled off in vacuo up to a temperature of 130° C. (15 mbar). Sodium sulfate was then separated off by filtration under pressure. An oily, yellowish liquid solidifying slowly at room temperature having an OH value of 424.4 (corresponding to a molecular weight of 264.4) and an ether group content of 1.969 moles per mole product was obtained. Yield: 62.8 kg (96.8% of theoretical).

A fraction of 8 kg was subjected to fractional distillation at 0.5 mbar. 1.45 kg hexanediol (18.13%), 3.18 kg dihydroxydihexyl ether (39.8%) and 3.37 kg oligoether were produced.

Polyether II

In a 6 liter 4-necked flask equipped with a stirrer, contact thermometer, column and water separator, 1770 g (15 moles) 1,6-hexanediol and 2400 g (15 moles) 1,9-nonanediol were heated together with 12 g naphthalene-1,5-disulfonic acid and toluene (recovered from production of Polyether I with a content of approximately 20% oxepane). By addition or removal of solvent, the mixture was kept boiling at 175° to 177° C. for 12 hours. 252 g (14 moles) water were obtained in the separator. After cooling, the contents of the flask were stirred for 2 h at 90° C. with 200 ml water and then neutralized by introduction of ammonia gas. After evaporation of all volatile constituents up to 130° C./12 mbar, the ammonium sulfate was filtered off. A light, low-melting wax having an OH value of 452 (molecular weight 248) was obtained. Ether group content: 0.92 mole per mole product.

Polyethers III–VIII

The starting products listed in Table 1 below were prepared in a 100 liter vessel in the same way as in Polyethers I and II. 1,6-hexanediol was used as sole starting material while naphthalene-1,5-disulfonic acid (0.37 wt. %) was used as the catalyst. The solvent, toluene, was again used. The proportion of oxepane increased to a diminishing extent.

The product yields were 96.5–98% (according to molecular weight). In every case, ammonia was used for neutralization.

TABLE 1

| Poly-ether | Etherification time (h) | Temperature °C. | OH Value | Molecular weight | Ether groups per mole |
|---|---|---|---|---|---|
| III | 21 | 180 | 225.8 | 497 | 3.79 |
| IV | 12.5 | 170 | 418 | 268.4 | 1.5 |
| V | 9.3 | 170 | 445.2 | 252 | 1.34 |
| VI | 5.5 | 170 | 594.9 | 188.6 | 0.706 |
| VII | 6 | 170 | 578.4 | 194 | 0.76 |
| VIII | 13.5 | 180 | 259.1 | 433 | 3.15 |

EXAMPLE 1

In a 100 l stirring vessel of V4A steel equipped with a controllable steam jacket heating system, a packed column (2 meters tall, 10 cm in diameter), a condenser heated to 50° C. and a receiver, 55.524 kg (210 moles) Polyether I and 38.52 kg (180 moles) diphenylcarbonate were heated under a pressure of 15 mbar with 1 g dibutyltin oxide as catalyst. Phenol began to distill off beyond a sump temperature of 135° C. Condensation was then continued at that temperature for about 6 hours. Approximately half of the theoretical quantity of phenol distilled off in this phase. The temperature was then gradually increased to 200° C. over a period of another 6 hours and left at that level (2 h) until no more phenol distilled off (quantity by then: 32.9 kg=97.2%). The pressure was then reduced to 2 mbar by means of an oil pump and residual phenol was distilled off over a period of another 3 hours at 200° C., completing the condensation reaction.

A low-melting, faintly colored wax having the following characteristic data was obtained:
OH value: 55.8
Molecular weight: 2.011
Softening point: 31° C.
Ratio of ether groups to carbonate groups 1:0.585
Viscosity: 8440 mPa.s at 50° C.

EXAMPLE 2

1809 g (8.3 moles) dihydroxydihexyl ether (Polyether I) were condensed with 1562 g (7.3 mole) diphenylcarbonate in a 4-liter four-necked flask as in Example 1. An almost colorless wax having the following characteristic data was obtained:
OH value: 56.3
Molecular weight: 2000
Softening point: 32° C.
Ratio of ether groups to carbonate groups: 1:0.875

Ether groups and carbonate groups were alternately arranged in the product. By virtue of the regular structure, the softening point was somewhat higher than that of products in which the groups are comparably, but statistically arranged.

EXAMPLE 3

2684 kg (10 moles) of Polyether IV and 624 kg (6 moles) 1,5-pentanediol were condensed with 2996 g (14 moles) diphenylcarbonate using the procedure described in Example 1. A polyether polycarbonate having the following characteristic data was obtained:
OH value: 61.2
Molecular weight: 1840
Softening point: >21° C. (lard-like)
Ratio of ether groups to carbonate groups: 1:0.93
Viscosity: 3400 mPa.s at 50° C.

EXAMPLE 4

2480 g (10 moles) of the Polyether II were condensed with 1712 g (8 moles) diphenylcarbonate using the procedure described in Example 1. A polyether polycarbonate having the following properties was obtained:
OH value: 83.5
Molecular weight: 1340
Softening point: 26° C.
Ratio of ether groups to carbonate groups: 1:0.87
Viscosity: 1200 mPa.s at 50° C.

EXAMPLES 5–10

The following products were all prepared in a 100 liter vessel in the same way as in Example 1. The molecular weight and ratio of ether groups to carbonate groups were varied. The Polyethers III to VIII and 1,6-hexanediol were used in admixture (except in Example 5). Instead of the absolute quantities, the molar ratios of the reactants are shown in Table 2 below.

TABLE 2

| Example | Polyether (Moles) III | IV | V | VI | VII | VIII | Hexane diol (moles) | Diphenyl Carbonate (moles) | OH Value | MW | Ether groups: Carbonate Groups | Softening Point | Viscosity at 50° C. mPa.s |
|---|---|---|---|---|---|---|---|---|---|---|---|---|---|
| 5 | 6 | — | — | — | — | — | — | 5 | 36.0 | 3100 | 1:0.22 | 39° C. | 4100 |
| 6 | — | 2.09 | — | — | 4.38 | — | 2.75 | 8.22 | 58.5 | 1920 | 1:1.27 | 19° C. | 3520 |
| 7 | — | 1.68 | — | — | 2.85 | — | 2.22 | 5.75 | 75.4 | 1490 | 1:1.27 | 18° C. | 1720 |
| 8 | — | 1.55 | — | 2.11 | — | — | 7.2 | 9.86 | 58.4 | 1920 | 1:2.7 | 32° C. | 4750 |
| 9 | — | — | 2.73 | — | — | 1.48 | 1.98 | 5.18 | 63.1 | 1780 | 1:0.65 | 34° C. | 1830 |
| 10 | 0.15 | — | 1.26 | — | — | 0.62 | 1.57 | 2.6 | 111.2 | 1010 | 1:0.64 | 31° C. | 600 |

EXAMPLES 11–13

PU elastomers of high strength, wear resistance, hydrolysis stability and, at the same time, good low-temperature behavior were prepared using the polyether-polycarbonate diols according to the invention and naphthylene-1,5-diisocyanate.

EXAMPLE 11

960 g (0.5 mole) of the diol described in Example 8 were heated to approximately 125° C. and, after the addition of 210 g (1.00 mole) naphthylene-1,5-diisocyanate, the mixture was immediately stirred intensively. After 2 minutes, the mixture was degassed in vacuo. An NCO prepolymer formed after about 15 minutes in an exothermic reaction. 33 g (0.733 mole) 1,4-butanediol were stirred into this prepolymer as crosslinking agent. The reacting mixture was poured in 1 minute into molds preheated to 110° C. and solidified therein after a few minutes.

The resulting elastomer was after-baked for 24 hours at 110° C. and then stored for 7 days at room temperature.

An elastomer having the properties shown in Table 3 was obtained.

EXAMPLE 12

960 g (0.5 mole) of the diol described in Example 6 were heated to approximately 125° C. and, after the addition of 210 g (1.00 mole) naphthylene-1,5-diisocyanate, the mixture was immediately stirred intensively. After 2 minutes, the mixture was degassed in vacuo. An NCO prepolymer was formed after about 15 minutes in an exothermic reaction. 33 g (0.733 mole) 1,4-butanediol were stirred into this prepolymer as crosslinking agent. The reacting mixture was poured in 1 minute into molds preheated to 110° C. and solidified therein after a few minutes.

The resulting elastomer was after-baked for 24 hours at 110° C. and then stored for 7 days at room temperature.

An elastomer having the properties shown in Table 3 was obtained.

EXAMPLE 13

890 g (0.5 mole) of the diol described in Example 9 were heated to approximately 125° C. and, after the addition of 180 g (0.857 mole) naphthylene-1,5-diisocyanate, the mixture was immediately stirred intensively. After 2 minutes, the mixture was degassed in vacuo. An NCO prepolymer was formed after about 15 minutes in an exothermic reaction. 20 g (0.444 mole) 1,4-butanediol were stirred into this prepolymer as crosslinking agent. The reacting mixture was poured in 1 minute into molds preheated 110° C. and solidified therein after a few minutes.

The resulting elastomer was after-baked for 24 hours at 110° C. and then stored for 7 days at room temperature.

An elastomer having the properties shown in Table 3 was obtained.

The elastomers of Examples 11–13 have a remarkably low glass transition temperature, high tear propagation resistance, good damping or modulus values and very high stability to hydrolysis. Swelling tests in various chemicals (Table 4) show overall good resistance to swelling. Apart from swelling in aromatics (toluene, ASTM OIL III), the swelling behavior is superior or equivalent to that of ester urethanes (Comparison Examples 1 and 2).

COMPARISON EXAMPLE 1

1000 g (0.5 mole) of a polyethylene adipate diol having an average molecular weight of 2000 were heated to approximately 125° C. and, after addition of 180 g (0.857 mole) naphthylene-1,5-diisocyanate, the mixture was immediately stirred intensively. After 2 minutes the mixture was degassed in vacuo. An NCO prepolymer was formed after about 15 minutes in an exothermic reaction. 20 g (0.444 mole) 1,4-butanediol were stirred into this prepolymer as crosslinking agent. The reacting mixture was poured in 1 minute into molds preheated to 110° C. and solidified therein after a few minutes.

The resulting elastomer was after-baked for 24 hours at 110° C. and then stored for 7 days at room temperature.

An elastomer having the properties shown in Table 3 was obtained.

COMPARISON EXAMPLE 2

1000 g (0.5 mole) of a hydroxyfunctional polyester prepared from adipic acid, 1,6-hexanediol and neopentyl glycol, average molecular weight 2000, were heated to approximately 125° C. and, after addition of 180 g (0.857 mole) naphthylene-1,5-diisocyanate, the mixture was immediately stirred intensively. After 2 minutes, the mixture was degassed in vacuo. An NCO prepolymer was formed after about 15 minutes in an exothermic reaction. 20 g (0.444 mole) 1,4-butanediol were stirred into this prepolymer as crosslinking agent. The reacting mixture was poured in 1 minute into molds preheated to 110° C. and solidified therein after a few minutes.

The resulting elastomer was after-baked for 24 hours at 110° C. and then stored for 7 days at room temperature.

An elastomer having the properties shown in Table 3 was obtained.

TABLE 3

|  |  | Example | | | Comparison | Comparison |
| --- | --- | --- | --- | --- | --- | --- |
|  |  | 11 | 12 | 13 | 1 | 2 |
| Shore A hardness (DIN 53505) |  | 92 | 91 | 94 | 82 | 79 |
| Shore D hardness (DIN 53505) |  | 36 | 35 | 37 | 29 | — |
| Abrasion loss (DIN 53516) (mm$^3$) |  | 30 | 25 | 24 | 40 | 46 |
| Torsion vibration test (DIN 53445) |  |  |  |  |  |  |
| Glass transition temperature | (°C.)— | −44 | −49 | −53 | −40 | −45 |
| Damping maximum | (°C.)— | −30 | −38 | −28 | −25 | −28 |
| —Modulus at 20° C. | (MPa) | 27 | 34 | 35 | 16 | 12 |
| Damping at 20° C. |  | 0.03 | 0.03 | 0.03 | 0.05 | 0.04 |
| —Modulus at 110° C. | (MPa) | 28 | 33 | 34 | 18 | 13 |
| Damping at 110° C |  | 0.02 | 0.02 | 0.02 | 0.04 | 0.03 |
| Tear propagation resistance (Graves)/ (DIN 53515) | (kN/m) | 61 | 52 | 65 | 49 | 32 |
| Breaking stress (DIN 53504) | (MPa) | 45 | 30 | 43 | 55 | 36 |
| Compression set (70° C.) (ASTM 385/B) |  | 21 | 21 | 23 | 22 | 26 |
| Shock elasticity (DIN 53512) (%) |  | 57 | 57 | 56 | 53 | 56 |
| Breaking stress after 14 days in | (MPa) | 38 | 33 | 31 | destroyed | 10 |

TABLE 3-continued

|  | Example 11 | Example 12 | Example 13 | Comparison 1 | Comparison 2 |
|---|---|---|---|---|---|
| water at 80° C. (DIN 53504) Shore hardness after 14 days in water at 80° C. (DIN 53505) | 91 | 91 | 93 | destroyed | 70 |

TABLE 4

SWELLING IN SOLVENT (28 d Immersion)
Plugs 29 mm in diameter, 12.5 mm deep

|  |  |  | Example 11 | Example 12 | Example 13 | Comparison 1 | Comparison 2 |
|---|---|---|---|---|---|---|---|
| ASTM oil I | RT | increase in weight (%) | 0.21 | 0.2 | 0.2 | 0 | 0 |
|  |  | increase in volume (%) | 0 | 0 | 0.5 | 0 | 0 |
|  |  | Shore A hardness | 93 | 93 | 93 | — | 79 |
| ASTM oil II | RT | increase in weight (%) | 0.3 | 1.3 | 1.4 | 0.4 | 0.7 |
|  |  | increase in volume (%) | 0.4 | 0.3 | 0.3 | 0.4 | 0.5 |
|  |  | Shore A hardness | 93 | 93 | 93 | — | 79 |
| ASTM oil III | RT | increase in weight (%) | 2.2 | 3.6 | 4.3 | 0.4 | 2.2 |
|  |  | increase in volume (%) | 1.4 | 2.4 | 4.6 | 0.9 | 3.2 |
|  |  | Shore A hardness | 93 | 92 | 93 | — | 79 |
| Acetone | RT | increase in weight (%) | 43 | 40 | 39 | 64 | 79 |
|  |  | increase in volume (%) | 59 | 55 | 50 | 98 | 101 |
|  |  | Shore A hardness | 83 | 85 | 85 | — | 60 |
| Toluene | RT | increase in weight (%) | 72 | 74 | 76 | 36 | 91 |
|  |  | increase in volume (%) | 91 | 92 | 94 | 53 | 115 |
|  |  | Shore A hardness | 82 | 83 | 82 | — | 61 |
| $H_2O$ | RT | increase in weight (%) | 0 | 0.3 | 0 | 1.3 | 0.6 |
|  |  | increase in volume (%) | 0 | 0 | 0 | 1.9 | 0.3 |
|  |  | Shore A hardness | 93 | 93 | 93 | — | 79 |
| Ethyl acetate | RT | increase in weight (%) | 53 | 51 | 50 | 58 | 86 |
|  |  | increase in volume (%) | 65 | 63 | 60 | 77 | 99 |
|  |  | Shore A hardness | 83 | 85 | 85 | — | 60 |
| Sodium hydrogen sulfite, 10%, 80° C. |  | increase in weight (%) | 1.3 | 0.8 | 1.1 | destroyed | destroyed |
|  |  | increase in volume (%) | 3.0 | 2.4 | 2.9 | destroyed | destroyed |
|  |  | Shore A hardness | 91 | 91 | 91 | destroyed | destroyed |

EXAMPLE 14

A very hard elastomer of high strength hydrolysis stability and, at the same time, good low-temperature and high-temperature behavior using the polyetherpolycarbonate diol from Example 1 and 4,4'-diphenylethane diisocyanate (MDI) was prepared.

Prepolymer A

A prepolymer was prepared from the polyether carbonate diol described in Example 1 (1000 5 mole) and MDI (610 g—2.44 moles). The polyol (40° C.) was added slowly with stirring to liquid MDI (70° C.), followed by stirring for 3 h. The temperature did not rise above 85° C. The prepolymer obtained was then degassed in vacuo at 85° C. The prepolymer had an NCO content of 9.76% (theoretical 10%).

1000 g (2.324 moles NCO) of the above-described Prepolymer A was heared to around 100° C. and degassed in vacuo. 4-chloro-3,5-diaminobenzoic acid isobutyl ester (260 g) was stirred into this prepolymer as crosslinking agent at 90° C. The reacting mixture was poured in 1 minute into molds preheated to 110° C. and solidified therein after a few minutes.

The resulting elastomer was after-baked for 24 h at 110° C. and then stored for 7 days at room temperature. An elastomer having the properties shown in Table 5 was obtained. The elastomer had a remarkably low glass transition temperature, high tear propagation resistance, relatively low abrasion and good damping and modulus values. It also showed extremely good thermal stability and resistance to hydrolysis.

TABLE 5

PROPERTIES OF ELASTOMERS BASED ON MDI

Example 14

| Property |  |  | Value |  |
|---|---|---|---|---|
| Shore D hardness | (DIN 53505) |  | 65 |  |
| Shore A hardness | (DIN 53505) |  | 96 |  |
| Abrasion loss | (DIN 53516) | $(mm^3)$ | 44 |  |
| Shock elasticity | (DIN 53512) | (%) | 46 |  |
| Tear propagation resistance | (DIN 53515) | (kN/m) | 136 |  |
| Breaking stress | (DIN 53504) | (MPa) | 40 | breaking stress after 15 weeks in water at 70° C. 34 MPa |
| Torsion vibration test | (DIN 53445) |  |  |  |
| Glass transition temperature | | (°C.) | −55 | Shore A/D hardness after 15 weeks in water at 70° C. |
| —Modulus |  |  |  |  |
| −30° C. |  | (MPa) | 642 | 98/64 |
| 20° C. |  | (MPa) | 306 |  |
| 70° C. |  | (MPa) | 204 |  |
| 110° C. |  | (MPa) |  |  |

TABLE 5-continued
PROPERTIES OF ELASTOMERS BASED ON MDI

Example 14

Damping
| | | |
|---|---|---|
| −30°C. | | 0.06 |
| 20°C. | | 0.05 |
| 70°C. | | 0.05 |
| 110°C. | | 0.04 |
| Tensile heat distortion ASTM D 648-B 0.45 MPa | (°C.) | >200 |

EXAMPLES 15 AND 16

Elastomers of high strength, wear resistance, hydrolysis stability and, at the same time, good low-temperature behavior using the polyether-polycarbonate diols from Examples 7 and 10 and toluene diisocyanate (TDI) were prepared.

EXAMPLE 15

Prepolymer B

A prepolymer was prepared from the polyether carbonate diol described in Example 7 by reaction with excess TDI (80% 2,4 TDI and 20% 2,6 TDI). In order to keep the free TDI content as low as possible, the prepolymer was then subjected to thin-layer evaporation.

Characteristic data:
NCO content 4.30%
viscosity at 70° C.:2250 mPa.s
free TDI 0.2%

1000 g of Prepolymer B were heated to approximately 100° C. and mixed with 122.5 g 4-chloro-3,5-diaminobenzoic acid isobutyl ester (90° C.) as crosslinking agent. The reacting mixture was poured in 1 minute into molds preheated to 110° C. and solidified therein after a few minutes.

The resulting elastomer was after-baked for 24 h at 110° C. and then stored for 7 days at room temperature. An elastomer having the properties shown in Table 6 was obtained.

EXAMPLE 16

Prepolymer C

A prepolymer was prepared from the polyether-polycarboante diol described in Example 10 by reaction with excess TDI (80% 2,4 TDI and 20% 2,6 TDI). In order to keep the free TDI content as low as possible, the prepolymer was subjected to thin-layer evaporation.

Characteristic data:
NCO content 6.1%
viscosity at 70° C.: 1500 mPa.s
free TDI 0.3%

1000 g Prepolymer C were heated to approximately 100° C. and mixed with 165 g 4-chloro-3,5-diaminobenzoic acid isobutyl ester (90° C.) as crosslinking agent. The reacting mixture was poured in 1 minute into molds preheated to 110° C. and solidified therein after a few minutes.

The resulting elastomer was after-baked for 24 hours at 110° C. and then stored for 7 days at room temperature.

An elastomer having the properties shown in Table 6 was obtained.

COMPARISON EXAMPLES 3 AND 4

Similar low-monomer polyester-TDI prepolymers which are commercially available were employed in these Examples.

Desmodur VP PU 0137 and Desmodur VP PU 0127 are available from Mobay Corporation and have the following characteristic data:

PU 0137:
NCO content 3.4±0.2%
viscosity at 70° C. approx. 2500 mPa.s
free TDI below 0.5%

PU 0127:
NCO content 6.8±0.3%
viscosity at 70° C. approx. 1500 mPa.s
free TDI below 0.5%

The NCO content may be adjusted as required in the range from 3.4% to 6.8% by admixture of these two prepolymers. For example, a 3 to 1 mixture of PU 0137 and PU 0127 has an NCO content of 4.7% (corresponds approximately to Prepolymer B) while a 3 to 1 mixture of PU 0127 and PU 0137 has an NCO content of approximately 5.8% (corresponds to the NCO content of Prepolymer C).

COMPARISON EXAMPLE 3

The above-described mixture containing 4.7% NCO (1000 g) was reacted with 4-chloro-3,5-diaminobenzoic acid isobutyl ester (113 g) in accordance with the procedure described in Example 15.

COMPARISON EXAMPLE 4

The above-described mixture containing 5.8% NCO (1000 g) was reacted with 4-chloro-3,5-diaminobenzoic acid isobutyl ester in accordance with the procedure described in Example 16.

TABLE 6
PROPERTIES OF ELASTOMERS BASED ON TDI

| | | | Example 15 | Example 16 | Comparison 3 | Comparison 4 |
|---|---|---|---|---|---|---|
| Shore A hardness | (DIN 53505) | | 93 | 98 | 93 | 96 |
| Shore D hardness | (DIN 53505) | | 43 | 55 | 41 | 54 |
| Abrasion loss | (DIN 53516) | (mm³) | 28 | 25 | 46 | 42 |
| Torsion vibration test | (DIN 53445) | | | | | |
| Glass transition temperature | | (°C.) | −48 | −50 | — | — |
| —Modulus at 20° C. | | (MPa) | 44 | 123 | — | — |
| Damping at 20° C. | | | 0.11 | 0.10 | — | — |
| —Modulus at 110° C. | | (MPa) | 32 | 53 | — | — |

TABLE 6-continued

| PROPERTIES OF ELASTOMERS BASED ON TDI | | | Example | | Comparison | Comparison |
| --- | --- | --- | --- | --- | --- | --- |
| | | | 15 | 16 | 3 | 4 |
| Damping at 110° C. | | | 0.02 | 0.05 | — | — |
| Tear propagation resistance | (DIN 53515) | (kN/m) | 54 | 84 | 57 | 83 |
| Compression set (70° C.) | (ASTM385/B) | (%) | 37 | 42 | 41 | 53 |
| Shock elasticity | (DIN 53512) | (%) | 36 | 37 | 32 | 30 |
| Breaking stress | (DIN 53504) | (MPa) | 47 | 51 | 65 | 51 |
| After storage for 12 weeks in water at 70° C. | | | | | | |
| Breaking stress | (DIN 53504) | (MPa) | 20 | 35 | destroyed | destroyed |
| Shore A hardness | (DIN 53505) | | 91 | 95 | destroyed | destroyed |
| Shore D hardness | (DIN 53505) | | 40 | 54 | destroyed | destroyed |
| Accelerated earth rotting test after 2 months, 15, 16 no visible rotting, (under stress, heat, moisture) after 4 months 15, 16 no visible rotting. | | | | | destroyed | destroyed |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A hydroxyl-terminated polyether polycarbonate having a molecular weight of from 500 to 12,000 containing hexamethylene groups as ether groups in which the ratio of ether groups to carbonate groups is from 1 to 1:5.

2. The composition of claim 1 in which up to mole % of the ether groups are pentamethylene, heptamethylene, octamethylene nonamethylene or decamethylene groups.

3. The composition of claim 1 in which the only ether groups present are hexamethylene groups.

4. The composition of claim 3 in which the ratio of ether groups to carbonate groups is from 3:1 to 1:3.

5. The composition of claim 2 in which the ratio of ether groups to carbonate groups is from 3:1 to 1:3.

6. The composition of claim 1 in which the ratio of ether groups to carbonate groups is from 3:1 to 1:3.

7. A process for the production of the hydroxyl-terminated polyether polycarbonate of claim 1 comprising (a) preparing a polyether having a molecular weight of from 150 to 500 by etherifying 50-100 mole % 1,6-hexanediol and 0-50 mole % of a second diol selected from 1,7-heptanediol, 1,8-octanediol and 1,9-nonanediol and (b) reacting the polyether prepared in (a) with a compound selected from diarylcarbonates, dialkyl carbonates, dioxolanones, hexanediol bischlorocarbonic acid esters, phosgene and urea to form a hydroxyl terminated polyether polycarbonate having a molecular weight of from 500 to 12,000.

8. The process of claim 7 in which step (a) comprises reacting a base with the α,Ω-diol, α,Ω-halogen alcohol or α,Ω-dihalogen alkane corresponding to the desired ether groups.

9. The process of claim 7 in which a diol selected from 1,5-pentanediol, 1,6-hexanediol, 1,7-heptanediol, 1,8-octanediol, 1,9-nonanediol and 1,10decanediol is added to the materials being reacted in (b).

10. The process of claim 9 in which the total of diols other than 1,6-hexanediol present during (a) and (b) is no more than 50 mole % of the total diol used.

11. A process for the production of a polyurethane comprising reacting the composition of claim 1 with a di- and/or polyisocyanate.

12. The process of claim 11 in which 0-50 wt. % of a relatively high molecular weight material containing at least two hydroxyl groups other than the composition of claim 1 is included in the reaction mixture.

13. The process of claim 12 in which at least one material selected from chain extending agents, blowing agents, inert solvents, catalysts surface active additives, reaction retarders, stabilizers, flame proofing agents, plasticizers, dyes, fillers, fungistatic and bacteriostatic substances and combinations thereof.

* * * * *